United States Patent
Bethscheider et al.

(10) Patent No.: US 6,535,546 B1
(45) Date of Patent: *Mar. 18, 2003

(54) METHOD AND APPARATUS FOR DETERMINING CHARACTERISTICS OF COMPONENTS OF A COMMUNICATION CHANNEL UNDER LOAD

(75) Inventors: Gerhard Bethscheider, Ayl (DE); Guy Harles, Howald (LU)

(73) Assignee: Societe Europeenne des Satellites S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 09/213,171

(22) Filed: Dec. 17, 1998

(30) Foreign Application Priority Data

Dec. 18, 1997 (EP) .............................. 97122421

(51) Int. Cl.[7] .................................. H04B 1/69
(52) U.S. Cl. .................. 375/145; 375/130; 375/142; 375/150; 375/297
(58) Field of Search .................. 375/130, 142, 375/145, 150, 147, 297; 370/335; 455/17; 702/108, 109

(56) References Cited

U.S. PATENT DOCUMENTS

| | | | |
|---|---|---|---|
| 4,279,018 A | * | 7/1981 | Carson .................. 375/149 |
| 4,637,017 A | | 1/1987 | Assal et al. .................. 370/318 |
| 5,036,523 A | | 7/1991 | Briskman .................. 370/141 |
| 5,546,421 A | | 8/1996 | Basile et al. |
| 5,559,828 A | * | 9/1996 | Armstrong et al. .......... 375/130 |
| 5,731,993 A | * | 3/1998 | Wachs et al. ................ 702/109 |
| 5,943,331 A | * | 8/1999 | Lavean .......................... 370/335 |
| 6,275,678 B1 | * | 8/2001 | Bethscheider et al. ......... 455/17 |

FOREIGN PATENT DOCUMENTS

| | | |
|---|---|---|
| DE | 3644175 A1 | 7/1988 |
| EP | 0420230 A2 | 4/1991 |

* cited by examiner

*Primary Examiner*—Shuwang Liu
(74) *Attorney, Agent, or Firm*—Wolf, Greenfield & Sacks, P.C.

(57) ABSTRACT

For determining characteristics of components of a communication channel, for example of a transponder in a communication satellite, a clean carrier signal f(t) is modulated with a pseudo noise signal PN(t) and transmitted through the communication channel at a level below the level of a payload signal which is transmitted via the communication channel simultaneously. The received signal s'(t) is correlated with same pseudo noise signal PN(t) to obtain a recovered carrier signal f'(t). Both the clean carrier signal f(t) and the recovered carrier signal f'(t) can be used to determine the desired characteristics. Since the PN modulated clean carrier signal s(t) is transmitted at a low level, it is possible to perform measurements without switching off the payload signal.

18 Claims, 4 Drawing Sheets

METHOD AND APPARATUS FOR DETERMINING CHARACTERISTICS OF COMPONENTS OF A COMMUNICATION CHANNEL UNDER LOAD

FIELD OF THE INVENTION

This invention relates to a method and an apparatus for determining characteristics of components of a communication channel, especially a transponder in a communication satellite under load.

BACKGROUND OF THE INVENTION

The characteristics of a communication channel may change during the lifetime of the equipment used. Various tests may be performed not only at the beginning of but also repeatedly during the lifetime to verify that the communication channel meets predetermined specifications. Usually, these tests are performed without normal traffic, i.e. without the communication channel being used for transmission of a communication signal. This scenario will be explained in the following in greater detail with reference to communication satellites but without limiting the invention disclosed further below to only this application although the invention is specifically applicable in this field.

In a communication satellite, a communication channel is set up by a transponder of the satellite comprising several components like a receiving antenna, an input demultiplexer, a power amplifier, an output multiplexer, and a transmitting antenna. Transponder characteristics, such as amplitude response and group delay, are measured not only at the beginning of life of the spacecraft on the ground and, after launch, in orbit but also during the lifetime. These measurements are conventionally carried out without normal traffic on the transponder, i.e. without a payload signal being transmitted to and being re-transmitted by the transponder.

The necessity of switching off the payload signal during tests represents a considerable drawback not only for the user of the transponder, since communication is interrupted, but also for the operator of the satellite since the tests have to be performed in an expedited manner to keep the interruption as short as possible. In some cases it is impossible to interrupt communications via the communication channel so that the components of these channels cannot be tested after having enters into operation.

SUMMARY OF THE INVENTION

It is an object of the present invention to provide a method and an apparatus for determining characteristics of components of a communication channel, especially a transponder of a satellite, without the necessity to interrupt traffic via the communication channel.

This object and other objects are achieved by a method for determining characteristics of components of a communication channel which is designed for transmitting a payload signal at a predetermined level, comprising: generating a first pseudo noise signal PN(t); modulating a clean carrier signal f(t) with said first pseudo noise signal PN(t) to generate a PN modulated clean carrier signal s(t); transmitting said PN modulated clean carrier signal s(t) simultaneously with said payload signal through said communication channel at a level below the level of said payload signal; receiving a receive signal s'(t) corresponding to said PN modulated clean carrier signal s(t) after having traveled through said communication channel; correlating said receive signal s'(t) with said first pseudo noise signal PN(t) to generate a recovered carrier signal f'(t); and determining characteristics of components of the communication channel on the basis of a comparison of said clean carrier signal f(t) and said recovered carrier signal f'(t).

Advantageously, the level of said PN modulated clean carrier signal s(t) is at least 15 dB, preferably 25 dB or more below the level of said payload signal.

In a further embodiment, said first pseudo noise signal PN(t) is a binary pseudo noise sequence, which is preferably generated by means of a feed back shift register.

A chiprate of said first pseudo noise signal PN(t) is less than 5 MChip/s and preferably less than or equal to 2.5 MChip/s.

In a further embodiment, said correlating of said receive signal s'(t) and said first pseudo noise signal PN(t) is achieved by delaying said first pseudo noise signal PN(t) and multiplying the delayed first pseudo noise signal PN(t) and said receive signal s'(t).

To generate a reference, the method according to the invention further comprises: generating a second pseudo noise signal $PN_R(t)$; modulating a reference carrier signal $f_R(t)$ with said second pseudo noise signal $PN_R(t)$ to generate a PN modulated reference carrier signal $s_R(t)$; transmitting said PN modulated reference carrier signal $S_R(t)$ through said communication channel at a level below the level of said payload signal; receiving a reference receive signal $s_R'(t)$ corresponding to said PN modulated reference carrier signal $s_R(t)$ after having traveled through said communication channel; correlating said reference receive signal $s_R'(t)$ with said second pseudo noise signal $PN_R(t)$ to generate a recovered reference carrier signal $f_R'(t)$; and determining characteristics of components of the communication channel also on the basis of a comparison of said reference carrier signal $f_R(t)$ and said recovered carrier signal $f_R'(t)$.

Advantageously, the level of said PN modulated reference carrier signal $s_R(t)$ is at least 15 dB, preferably 25 dB or more below the level of said payload signal.

In a further embodiment, said second pseudo noise signal PN(t) is a binary pseudo noise sequence which is preferably generated by means of a feed back shift register.

In a further embodiment, said correlating of said reference receive signal $s_R'(t)$ and said second pseudo noise signal $PN_R(t)$ is achieved by delaying said second pseudo noise signal $PN_R(t)$ and multiplying the delayed second pseudo noise signal $PN_R(t)$ and said reference receive signal $s_R(t)$ can also be transmitte through a different transponder of the satellite.

The method of the invention as characterized above is especially applicable when said communication channel is a transponder of a communication satellite. Said PN modulated reference signal $s_R(t)$ may be transmitted through the same transponder of the satellite, but then said second pseudo noise signal $PN_R(t)$ must not correlated with said pseudo noise signal PN(t). Said PN modulated reference signal $s_R(t)$ can also be transmitted through a different transponder of the satellite.

The characteristics of said communication channel may be group delay and amplitude response.

The above objects and other objects are also achieved by an apparatus for determining characteristics of components of a communication channel which is designed for transmitting a payload signal at a predetermined level, comprising first pseudo noise signal generating means for generating a pseudo noise signal PN(t); first modulating means for modulating a clean carrier signal f(t) with said first pseudo noise signal PN(t) to generate a PN modulated clean carrier signal s(t); transmitting means for transmitting said PN modulated clean carrier signal s(t) through said communication channel at a level below the level of said payload signal; receiving means for receiving a receive signal s'(t) corresponding to said PN modulated clean carrier signal s(t) after having traveled through said communication channel; and first correlating means for correlating said receive signal s'(t) with said pseudo noise signal PN(t) to generate a recovered carrier signal f'(t).

Advantageously, the level of said PN modulated clean carrier signal s(t) is at least 15 dB, preferably 25 dB or more below the level of said payload signal.

In a further embodiment, said first pseudo noise signal generating means is a feed back shift register.

A chiprate of said first pseudo noise signal PN(t) is less than 5 MChip/s preferably less than or equal to 2.5 MChip/s.

In a further embodiment, the above apparatus comprises first delaying means for delaying said first pseudo noise signal PN(t).

To obtain a reference, the above apparatus further comprises second pseudo noise generating means for generating a second pseudo noise signal $PN_R(t)$; second modulating means for modulating a reference carrier signal $f_R(t)$ with said second pseudo noise signal $PN_R(t)$ to generate a PN modulated reference carrier signal $s_R(t)$; transmitting means for transmitting said PN modulated reference carrier signal $s_R(t)$ through said communication channel at a level below the level of said payload signal; receiving means for receiving a reference receive signal $s_R'(t)$ corresponding to said PN modulated reference carrier signal $s_R(t)$ after having traveled through said communication channel; and second correlating means for correlating said reference receive signal $s_R'(t)$ with said second pseudo noise signal $PN_R(t)$ to generate a recovered reference carrier signal $f_R'(t)$.

Advantageously, the level of said PN modulated reference carrier signal s(t) is at least 15 dB, preferably 25 dB or more below the level of said payload signal.

In a further embodiment, said second pseudo noise signal generating means is a feed back shift register.

In a further embodiment, the above apparatus further comprises second delaying means for delaying said second pseudo noise signal $PN_R(t)$.

In summary, for determining characteristics of components of a communication channel, for example of a transponder in a communication satellite, a clean carrier signal f(t) is modulated with a pseudo noise signal PN(t) and transmitted through the communication channel at a level below the level of said payload signal which is designed for transmitting a payload signal. The received signal s'(t) is correlated with the same pseudo noise signal PN(t) to obtain a recovered carrier signal f'(t). The clean carrier signal f(t) and the recovered carrier signal f'(t) are used together to determine the desired characteristics. Since the PN modulated clean carrier signal s(t) is transmitted at a low level, it is possible to perform measurements without switching off the payload signal.

The most important advantage of the method and the apparatus according to the invention is of course that the payload signal does not have to be switched off for performing the measurements. This limits considerably the downtime required for maintenance and verification of the communication channel, and thus increases availability of services.

Another very important advantage is the fact that with this method and apparatus, it is possible to measure characteristics of components of the communication channel under realistic conditions. For example, in a satellite transponder the IMUX and OMUX filters are waveguide filters and the characteristics of these filters are changing with the temperature. Normally, the filters are not uniformly heated during operation but are heated depending on the payload signal. When the payload signal is switched off the temperature distribution changes compared to normal operation even if the test signals provide a certain power for heating the filters. Thus, with conventional methods characteristics cannot be determined under conditions present in the communication channel under load. In addition, in the proposed method the spectral power density of the measurement signal is considerably lower than the spectral power density of the payload signal, so that it is possible to characterise the behaviour of the communications channel under the most realistic circumstances.

A further advantage of the invention is that in the case of a satellite communication channel the conversion frequency of the uplink/downlink can be measured without interruption of the payload signal and simultaneously with the other measurements.

BRIEF DESCRIPTION OF THE DRAWINGS

In the following an embodiment of the invention will be described in greater detail and with reference to the drawings.

DETAILED DESCRIPTION

Figure 1:
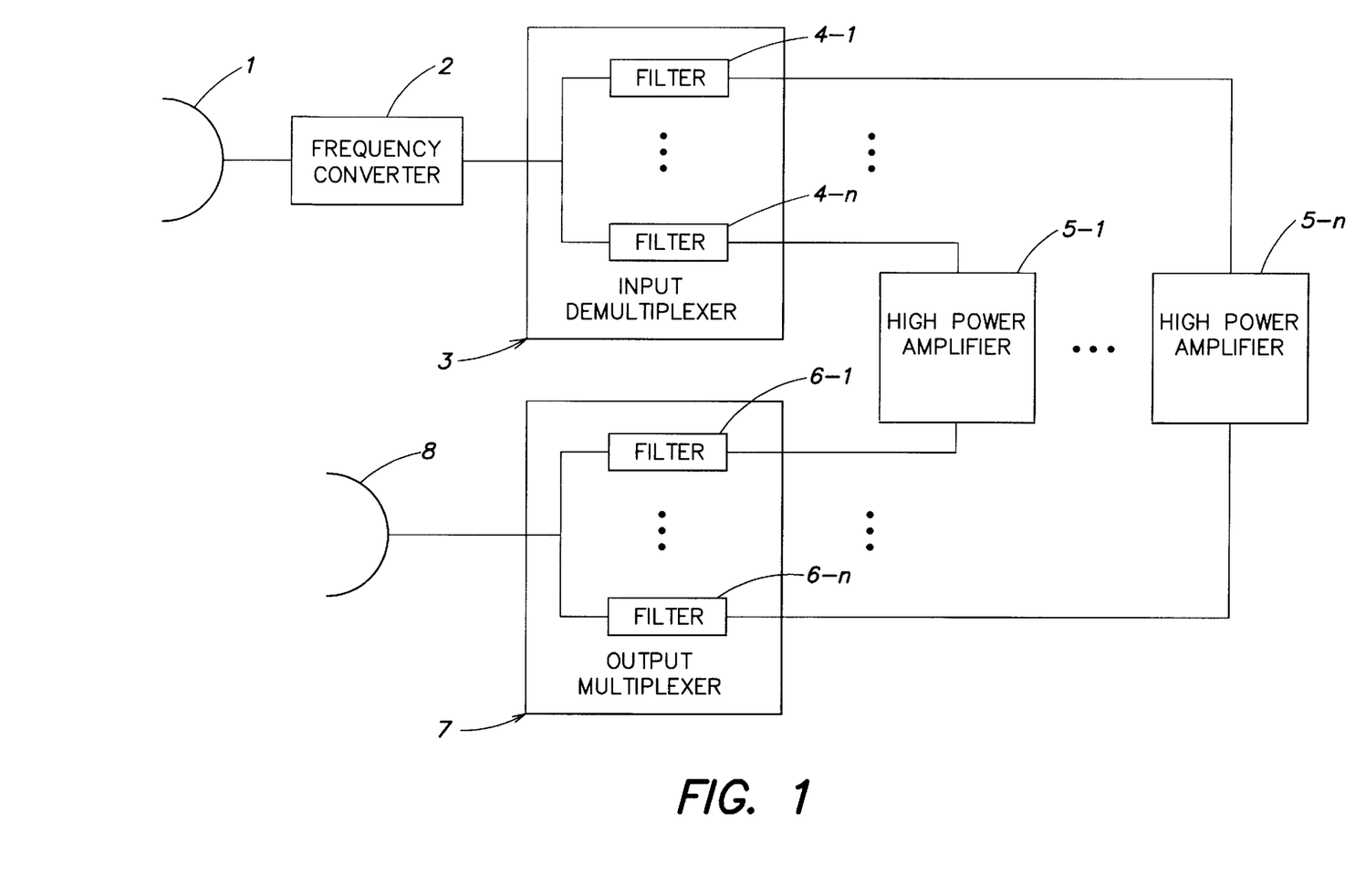
FIG. 1 shows a schematic diagram of a transponder of a communication satellite.

For the purpose of describing an embodiment of the invention, FIG. 1 shows the components of a transponder in a communication satellite as an example for a communication channel.

A transponder of a communication satellite comprises a receiving antenna 1 for receiving an uplink signal send from a ground station (not shown). An output signal of said receiving antenna 1 is fed to an input demultiplexer (IMUX) 3 after frequency conversion in frequency converter 2. Said input demultiplexer 3 comprises several first filters 4-1 to 4-n for separating individual signals within the signal from the antenna. Typically, one filter is provided for each signal to be separated from the other signals received via said receiving antenna 1 and corresponds to a communication channel. The n output signals of said input demultiplexer 3 are fed to a corresponding number of high power amplifiers 5-1 to 5-n in each of which a traveling wave tube (TWT) is employed for amplifying the output signals of said input demultiplexer 3. As each of said high power amplifiers is normally operated in its saturation point, multiple signals would create intermodulation products and distortion of the signals. The amplifier output signals are passed through second filters 6-1 to 6-n which are part of an output multiplexer (OMUX) 7 combining the n amplifier output signals. The output signal of said output multiplexer 7 is fed to a transmitting antenna 8 for being transmitted to the desired area on the ground.

Since the filters provided in the input demultiplexer (IMUX) 3 and the output multiplexer (OMUX) 7 have a strong influence on the performance of the transponder, the method according to the invention will be explained in following with respect to measuring two specific characteristics, namely amplitude response and group delay, of these components of the transponder communication. channels, the method of the invention being especially suitable for this application. However, the same or other characteristics of other components of the communication channel can be determined by means of the method and the apparatus according to the invention.

Figure 2:
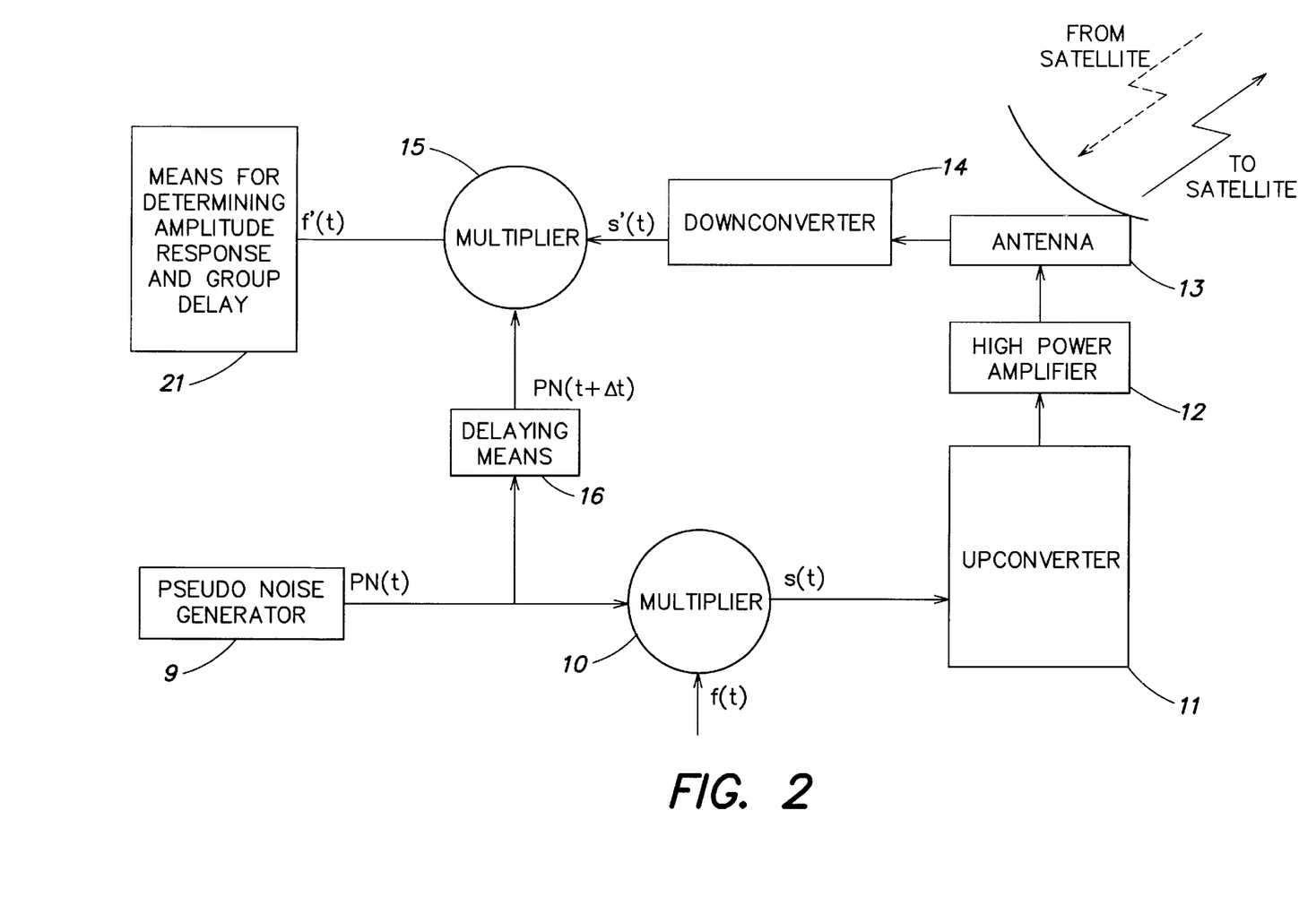
FIG. 2 shows a schematic diagram of a first embodiment of an apparatus according to the invention.

According to the invention, in a ground station as shown in FIG. 2, a pseudo noise signal PN(t) is generated by means of a pseudo noise signal generator 9, for example, a feed back shift register or a memory device in which a sequence of values of a pseudo noise signal is stored. The pseudo noise signal PN(t) has a very sharp autocorrelation function at zero delay. This allows to determine the time delay between the locally generated pseudo noise signal PN(t) and a received signal which is delayed due to the propagation time. A clean carrier signal f(t) having a variable frequency, which is changed as explained further below, is modulated with said pseudo noise signal PN(t) by means of a first multiplier 10 to form a PN modulated clean carrier signal s(t)=PN(t)×f(t). The chiprate of the pseudo noise signal PN(t), which determines the bandwidth of this signal, is chosen such the bandwidth of the PN modulated clean carrier signal s(t) is narrow in comparison with the expected peaks in group delay of the communication channel. Typically, the chiprate of the pseudo noise signal may be chosen less than 5 MChip/s.

The PN modulated clean carrier signal s(t) is fed to an upconverter 11 and via a high power amplifier 12 to an antenna 13 which transmits the PN modulated clean carrier signal s(t) to the transponder of the communication satellite under test. However, from the viewpoint of a user transmitting a payload signal to the satellite, the transponder remains usable during the test and can be continuously supplied with a payload signal.

According to the invention, the level of the transmitted PN modulated clean carrier signal s(t) is sufficiently below the level of the payload signal, for example about 15 to 25 dB or more, such that the payload signal is not notably deteriorated. For this reason, the PN modulated clean carrier signal s(t) can be transmitted while the communication channel is in use, i.e. simultaneously with a payload signal being transmitted to the transponder of the satellite from the same or from another ground station.

The frequency of the clean carrier signal f(t) is changed such that it sweeps from the lowest to the highest frequency of the pass band of the filters in the satellite transponder, or any other component of a general communication channel under test. The PN modulated clean carrier signal s(t) has a narrow bandwidth due to the pseudo noise signal PN(t) such that amplitude response and group delay of the communication channel can be determined at selected discrete frequencies, as will be described in the following.

In the embodiment, antenna 13 is also used to receive the signal re-transmitted by the transponder of the satellite, in other words the signal which has traveled through the communication channel. The output signal of antenna 13 is passed through a downconverter 14 to obtain a receive signal s'(t) which is fed to a second multiplier 15 receiving also the same but delayed pseudo noise signal PN(t). The delay is generated by delaying means 16 which are set such that the output of the second multiplier 15 becomes maximal. Thereby, the receive signal s'(t) is multiplied, in other words correlated with the very same pseudo noise signal PN(t) which has been used for generating the PN modulated clean carrier signal s(t) and a recovered carrier signal f'(t) is obtained which is only delayed and attenuated in comparison with the clean carrier signal f(t). Thus, the amplitude response, which corresponds to the attenuation of the recovered carrier signal f'(t), and the group delay, which corresponds to the delay of the recovered carrier signal f'(t), of the transponder of the satellite, as an example of a general communication channel, can easily be determined by means for determining amplitude response and group delay 21. The runtime of a narrowband signal at its center frequency corresponds to the group delay of the filters if the phase can be linearly approximated in the signal bandwidth. The chiprate of the PN signal is determined accordingly.

As far as communication satellites are concerned, it is sufficient to determine the amplitude response and group delay over the pass band of a transponder only relative to the amplitude response and group delay at the center frequency of the pass band. Therefore, it is sufficient to delay the pseudo noise signal PN(t) such that the amplitude of the recovered carrier signal f'(t) becomes maximal and to subtract the amplitude and the delay at the center frequency from the amplitude and the delay at any other frequency in the pass band, respectively.

Figure 3A:
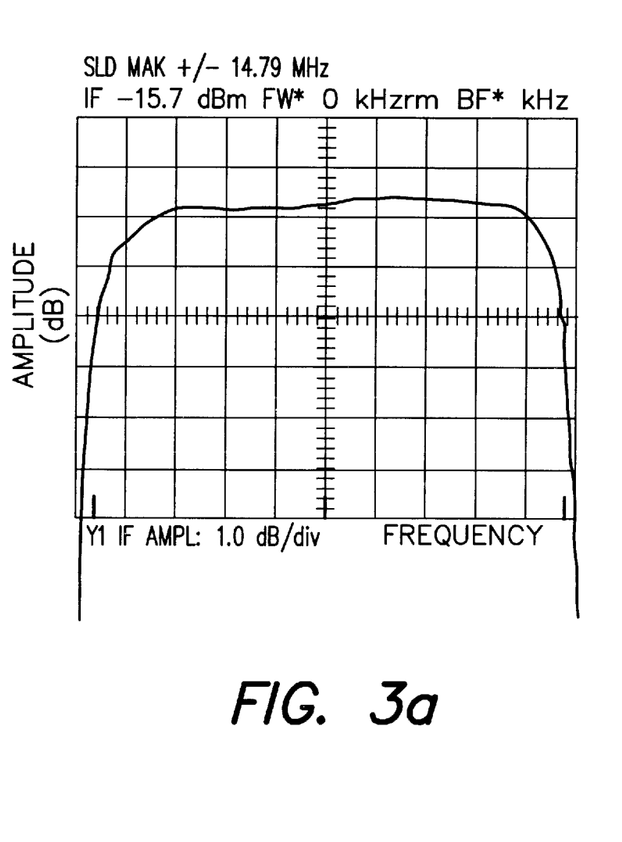
FIGS. 3a and 3b show diagrams representing measurement result.
Figure 3B:
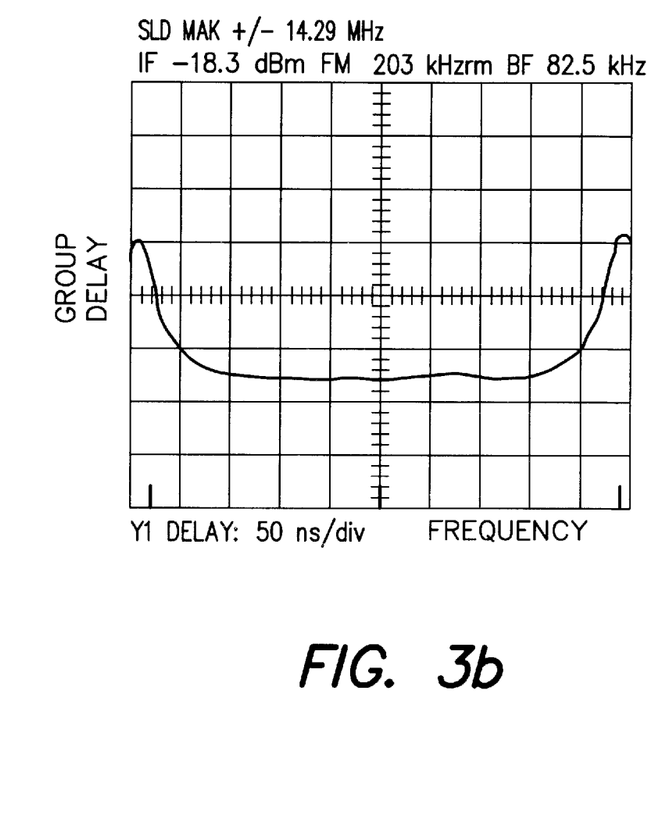

FIGS. 3a and 3b show typical measurement result for amplitude response (FIG. 3a) and group delay (FIG. 3b) as obtained by the method according to the invention.

In the case of a satellite communication channel, i.e. a transponder, it should be noted that, during measurements, due to the movements of the satellite the distance to the satellite can change. Also, during measurements, due to atmospherical effects the attenuation of the path loss between the ground station and the satellite can change. Since in the above embodiment the amplitude response and the group delay is determined by subtracting the amplitude response and the group delay at the center frequency from the respective values at other discrete frequencies, an error might occur due to the before mentioned satellite movements and atmospherical effects or other influences.

Figure 4:
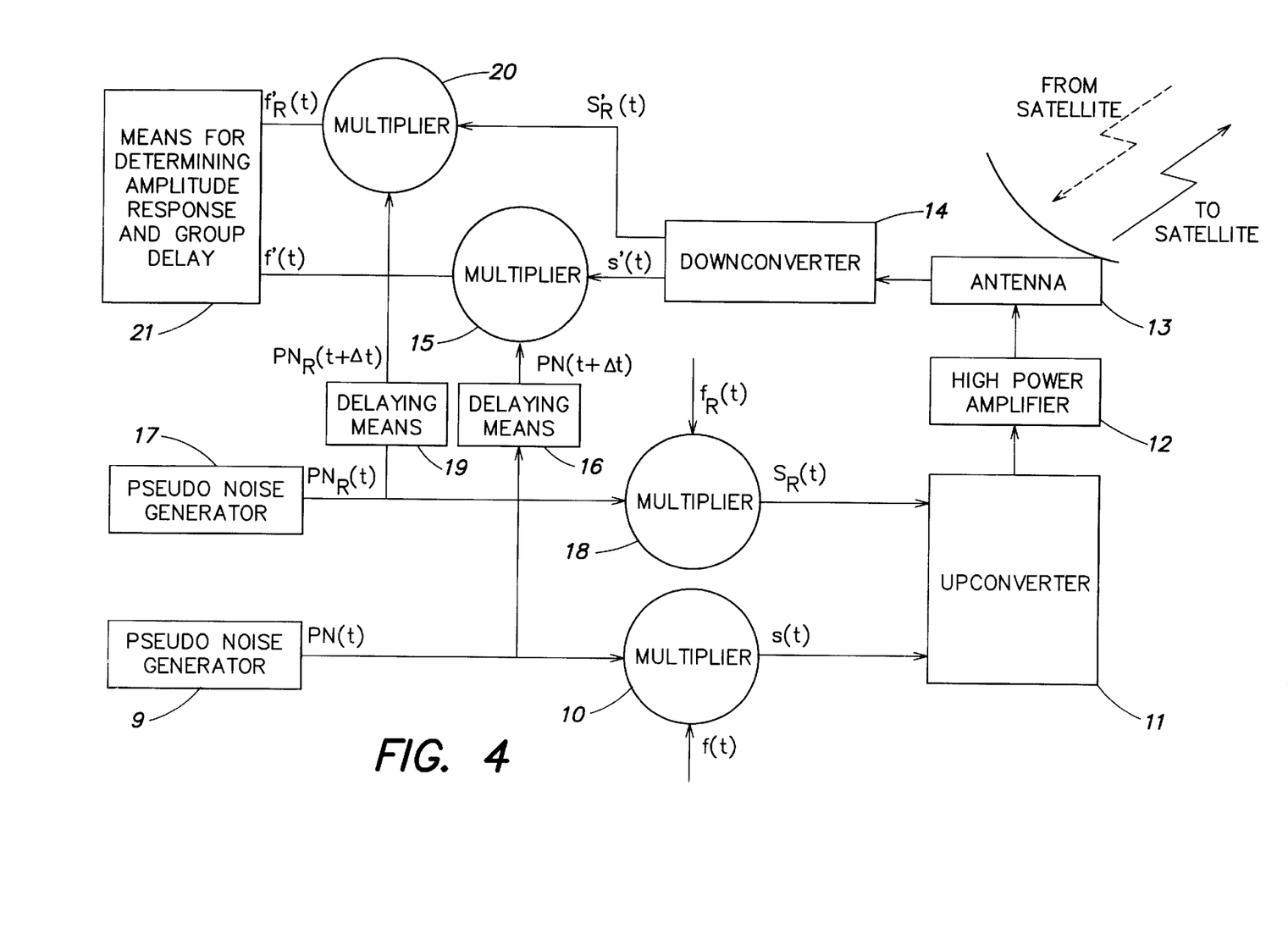
FIG. 4 shows a schematic diagram of a second embodiment of an apparatus according to the invention.

As shown in FIG. 4, an reference signal $s_R(t)$ can be used to compensate the before mentioned measurement error. In FIG. 4 the same reference signs are used for those parts already described above and reference is made to the above description of these parts. The reference signal $s_R(t)$ is generated by means of a third multiplier 18 which receives a second pseudo noise signal $PN_R(t)$, which is not correlated with the first pseudo noise signal PN(t) and which is generated by a second pseudo noise generator 17, and a reference carrier signal $f_R(t)$ which may be located at a fixed frequency somewhere within the pass band of the same transponder or in the pass band of another transponder on the same satellite having a different center frequency. Like in the above embodiment, a PN modulated reference carrier signal $s_R(t)$ is transmitted to the satellite and the reference receive signal $s_R'(t)$ is multiplied with the second pseudo noise signal $PN_R(T)$ to obtain the recovered reference signal $f_R'(t)$. While the measurement signal is swept in frequency over the transponder pass band, the frequency of the reference carrier signal $f_R(t)$ remains at a fixed frequency. Therefore, a corrected amplitude response and group delay of the communications channel can be obtained by subtracting the values of the reference signal from the values of the measurement signals at the respective time.

A variation of the described measuring the group delay consists of measuring the phase of the reconstructed carrier of the PN modulated signal at a specified frequency very close to the first frequency, it is possible to approximate the group delay at the frequency located in the middle of both measurement frequencies by calculating the phase difference and dividing by the frequency difference.

Only pseudo noise signals have been discussed above because these signals can be generated comparatively easily. However, true noise signals can be used in the method and the apparatus according to the invention. Properties of true and pseudo noise signals are well known to those skilled in the art and are described, for example in Bernard Sklar, "Digital Communications—Fundamentals and Applications", Prentice Hall, 1988.

What is claimed is:

1. Method for determining characteristics of components of a communication channel through which a payload signal is transmitted at a predetermined level, comprising:

generating a first pseudo noise signal PN(t);

modulating a clean carrier signal f(t) with said first pseudo noise signal PN(t) to generate a PN modulated clean carrier signal s(t);

transmitting said PN modulated clean carrier signal s(t) simultaneously with said payload signal through said communication channel at a level below the level of said payload signal;

receiving a receive signal s'(t) corresponding to said PN modulated clean carrier signal s(t) after having travelled through said communication channel;

correlating said receive signal s'(t) with said first pseudo noise signal PN(t) to generate a recovered carrier signal f'(t); and determining the amplitude response and the group delay of the communication channel at selected discrete frequencies on the basis of a comparison of said clean carrier signal f(t) and said recovered carrier signal f'(t).

2. Method according to claim 1, wherein the PN modulated clean carrier signal s(t) has a narrow bandwidth such that the runtime of the PN modulated clean carrier signal s(t) corresponds to the group delay at its center frequency.

3. Method according to claim 1, wherein the attenuation of the recovered carrier signal f'(t) corresponds to the amplitude response of the communication channel.

4. Method according to claim 1, wherein said correlating of said receive signal s'(t) and said first pseudo noise signal PN(t) is achieved by delaying said first pseudo noise signal PN(t) and multiplying the delayed first pseudo noise signal PN(t) and said receive signal s'(t).

5. Method according to claim 4, wherein the pseudo noise signal PN(t) is delayed such that the amplitude of the recovered carrier signal f'(t) becomes maximal.

6. Method according to claim 1, wherein the amplitude response and the group delay are determined over the pass band of a communication channel relative to the amplitude response and the group delay at the center frequency of the pass band.

7. Method according to claim 6, wherein the amplitude response and the group delay at the center frequency are subtracted from the amplitude response and the group delay at any other frequency in the pass band.

8. Method according to claim 1, further comprising:

generating a second pseudo noise signal $PN_R(t)$;

modulating a reference carrier signal $f_R(t)$ with said second pseudo noise signal $PN_R(t)$ to generate a PN modulated reference carrier signal $S_R(t)$;

transmitting said PN modulated reference carrier signal $S_R(t)$ simultaneously with said payload signal through said communication channel at a level below the level of said payload signal;

receiving a reference receive signal $S_R'(t)$ corresponding to said PN modulated reference carrier signal $S_R(t)$ after having travelled through said communication channel;

correlating said reference receive signal $S_R'(t)$ with said second pseudo noise signal $PN_R(t)$ to generate a recovered reference carrier signal $f_R'(t)$; and determining a corrected amplitude response and a corrected group delay of the communication channel at selected discrete frequencies also on the basis of a comparison of said reference carrier signal $f_R(t)$ and said recovered reference carrier signal $f_R'(t)$.

9. Method according to claim 8, wherein the corrected amplitude response and the corrected group delay of the communications channel are obtained by subtracting the values obtained by the reference carrier signal $f_R(t)$ and the recovered carrier signal $f_R'(t)$ from the values obtained by the clean carrier signal $f_r(t)$ and the recovered reference carrier signal $f_R'(t)$.

10. Apparatus for determining characteristics of components of a communication channel through which a payload signal is transmitted at a predetermined level, comprising:

means for generating a first pseudo noise signal PN(t);

means for modulating a clean carrier signal f(t) with said first pseudo noise signal PN(t) to generate a PN modulated clean carrier signal s(t);

means for transmitting said PN modulated clean carrier signal s(t) simultaneously with said payload signal through said communication channel at a level below the level of said payload signal;

means for receiving a receive signal s'(t) corresponding to said PN modulated clean carrier signal s(t) after having travelled through said communication channel;

means for correlating said receive signal s'(t) with said first pseudo noise signal PN(t) to generate a recovered carrier signal f'(t); and means for determining the amplitude response and the group delay of the communication channel at selected discrete frequencies on the basis of a comparison of said clean carrier signal f(t) and said recovered carrier signal f'(t).

11. Apparatus according to claim 10, wherein the PN modulated clean carrier signal s(t) has a narrow bandwidth such that the runtime of the PN modulated clean carrier signal s(t) corresponds to the group delay at its center frequency.

12. Apparatus according to claim 10, wherein the attenuation of the recovered carrier signal f'(t) corresponds to the amplitude response of the communication channel.

13. Apparatus according to claim 10, wherein said correlating comprises a delaying means for delaying said first pseudo noise signal PN(t) and a multiplying means for multiplying the delayed first pseudo noise signal PN(t) and said receive signal s'(t).

14. Apparatus according to claim 13, wherein the delay time of said delaying means is such that the amplitude of the recovered carrier signal f'(t) becomes maximal.

15. Apparatus according to claim 10, wherein the amplitude response and the group delay are determined over the pass band of a communication channel relative to the amplitude response and the group delay at the center frequency of the pass band.

16. Apparatus according to claim 15, wherein the amplitude response and the group delay at the center frequency are subtracted from the amplitude response and the group delay at any other frequency in the pass band.

17. Apparatus according to claim 10, further comprising:

means for generating a second pseudo noise signal $PN_R(t)$;

means for modulating a reference carrier signal $f_R(t)$ with said second pseudo noise signal $PN_R(t)$ to generate a PN modulated reference carrier signal $S_R(t)$;

means for transmitting said PN modulated reference carrier signal $S_R(t)$ simultaneously with said payload signal through said communication channel at a level below the level of said payload signal;

means for receiving a reference receive signal $S_R'(t)$ corresponding to said PN modulated reference carrier signal $S_R(t)$ after having travelled through said communication channel;

means for correlating said reference receive signal $S_R'(t)$ with said second pseudo noise signal $PN_R(t)$ to generate a recovered reference carrier signal $f_R'(t)$; and means for determining a corrected amplitude response and a corrected group delay of the communication channel at selected discrete frequencies also on the basis of a comparison of said reference carrier signal $f_R(t)$ and said recovered reference carrier signal $f_R'(t)$.

18. Apparatus according to claim 17, wherein the corrected amplitude response and the corrected group delay of the communications channel are obtained by subtracting the values obtained by the reference carrier signal $f_R(t)$ and the recovered carrier signal $f_R'(t)$ from the values obtained by the clean carrier signal $f(t)$ and the recovered reference carrier signal $f'(t)$.

* * * * *

UNITED STATES PATENT AND TRADEMARK OFFICE
CERTIFICATE OF CORRECTION

PATENT NO. : 6,535,546 B1
DATED : March 18, 2003
INVENTOR(S) : Bethscheider et al.

It is certified that error appears in the above-identified patent and that said Letters Patent is hereby corrected as shown below:

<u>Column 8,</u>
Line 20, please change "$f_r(t)$" to -- $f(t)$ --.

Signed and Sealed this

Sixth Day of May, 2003

JAMES E. ROGAN
*Director of the United States Patent and Trademark Office*